April 18, 1961  R. F. PAGE  2,980,457
HANDLE FOR SQUEEGEES, BRUSHES, AND OTHER IMPLEMENTS
Filed June 2, 1959
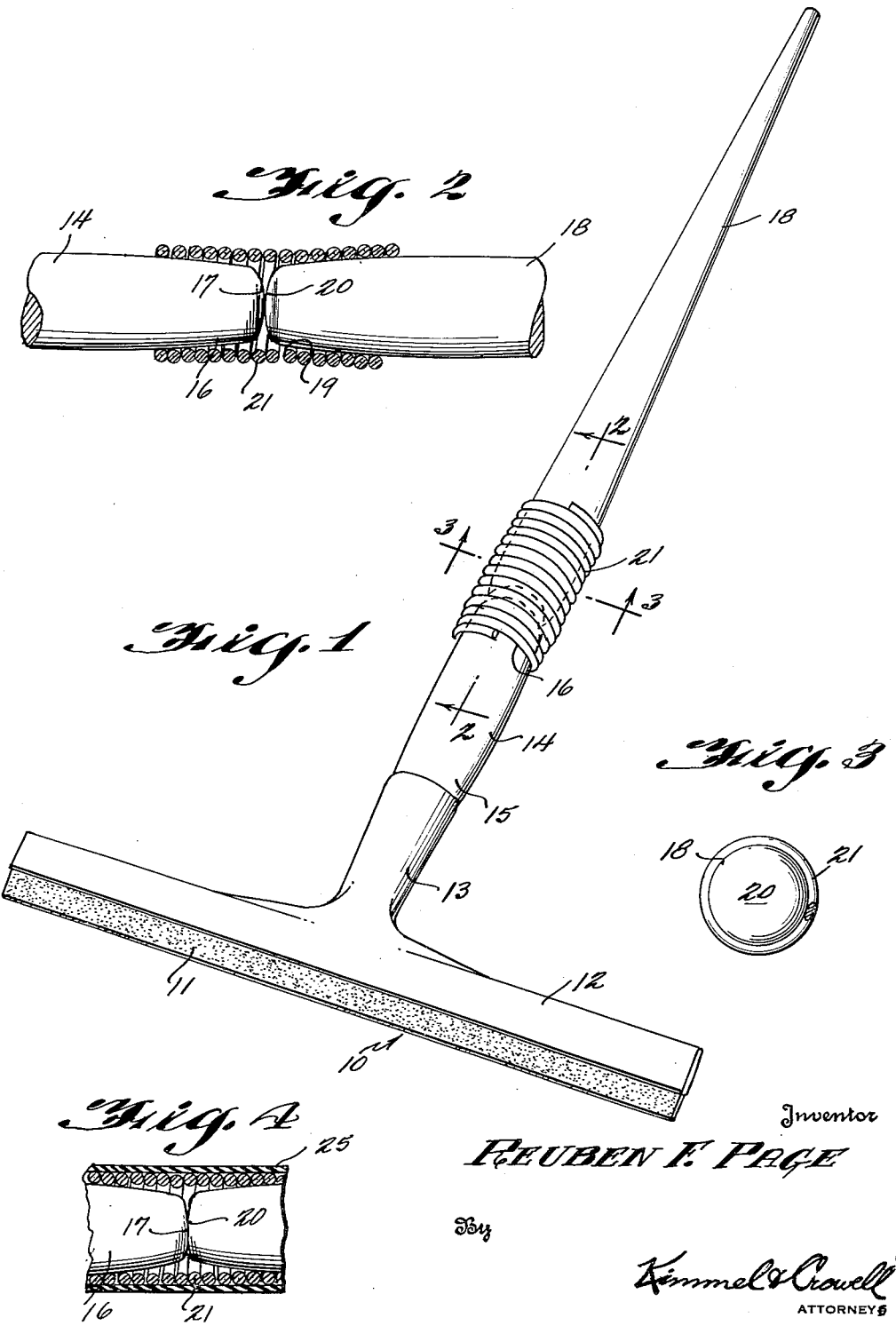
Inventor
REUBEN F. PAGE
By
Kemmel & Crowell
ATTORNEYS

United States Patent Office 2,980,457
Patented Apr. 18, 1961

2,980,457

HANDLE FOR SQUEEGEES, BRUSHES AND OTHER IMPLEMENTS

Reuben F. Page, 555 Chain Drive, Appleton, Wis., assignor of one-half to Joseph A. Loberger, Appleton, Wis.

Filed June 2, 1959, Ser. No. 817,647

1 Claim. (Cl. 287—86)

This invention relates to a handle and to a means for flexibly connecting said handle with a cleaning implement such as a squeegee, a brush, or other implement, wherein a simple, inexpensive, easy to manage, combination of a handle, flexible connection, and implement is desired.

Other objects of the invention are to provide a unit of the kind described which can be made in various sizes for various uses in homes, offices, and industry, and which with a brush head, or other suitable head, can be utilized in washing windows, automobiles, walls, etc.

The invention, in one aspect thereof, contemplates a protective cover or boot for the conection so as to insulate same against contact with a surface which might otherwise be marred by the metal of which the connection is constructed.

It will be noted from the detailed description and the drawings forming a part of this application that the connection element shown requires no extraneous means such as screws, bolts or the like and when in place has a permanent gripping effect on the respective ends of the handle and of the stub handle portion of the related implement. This is important as it minimizes material cost and assembly time, and maintains its simplicity of original design. So great is the strength of the connection that by actual test two men of average size and strength found it next to impossible by a straight pull to disconnect the assembly.

Another object of the invention is to provide a flexible handle in which the handle is normally maintained in a straight line position and can be resiliently deflected to change the angle of an implement connected thereto with respect to the remainder of the handle.

A still further object of the invention is to provide a squeegee and flexible handle therefor which is inexpensive to manufacture, simple to use and which effectively eliminates the chatter found in conventional blades near the bottom of tall windows.

Other objects and advantages will become apparent in the following specification when considered in light of the attached drawings, in which:

Figure 1 is a perspective view of the invention;

Figure 2 is an enlarged fragmentary longitudinal section taken along the line 2—2 of Figure 1, looking in the direction of the arrows;

Figure 3 is an enlarged fragmentary transverse section taken along the line 3—3 of Figure 1, looking in the direction of the arrows; and Figure 4 is a fragmentary detail in section, showing the inclusion of a protective cover for the coil spring.

Referring now to the drawings in detail wherein like reference characters indicate like parts throughout the several figures, the reference numeral 10 indicates generally a squeegee and flexible handle therefor constructed in accordance with the invention. The squeegee is merely representative of any desired implement.

The squeegee 10 comprises an elongated flat rubber blade 11 extending from and clamped in a head 12. A conically socketed shank 13 is integrally secured to the head 12 and extends perpendicularly therefrom.

A stub handle 14 for the squeegee or for a brush head or other implement is provided with a tapered end portion 15 which is seated in the socket of the shank 13. The opposite end of the stub handle 14 is inwardly tapered at 16 terminating in a semi-spherical domed end 17. An elongated generally cylindrical handle 18 is arranged in axially aligned relation to the stub handle 14 and has the inner end thereof inwardly tapered, as at 19. The tapered end 19 of the handle 18 terminates in a semi-spherical domed end potrion 20. The domed ends 17 and 20 are positioned so as to be in central contact with each other.

A coil spring 21 encompasses the tapered ends 16, 19 of the stub handle 14 and the handle 18, as shown in Figure 2. The spring 21 serves the dual function of permitting flexing of the handle 18 with respect to the stub handle 14, while simultaneously holding the handle 18 against the stub handle 14 so that the domed ends 17, 20 are in contact with each other. The contact of the domed ends 17, 20 permits the device to be used with the squeegee blade 11 or other implement, remaining relatively fixed with respect to the handle 18. However, when required, additional pressure can cause the stub handle 14 to deflect with respect to the handle 18 so that the angle of the implement or squeegee blade 11 with respect to a window or other surface can be uniformly maintained.

Said spring 21, as seen in Figure 2, has at only its end portions close gripping contact with the handles 14 and 18, and only along portions of the end portions of said handles.

Conventional squeegees require that the blade be removed from the handle and used with successively shorter handles when removing water from tall show windows. With the present invention, the head 12 can be kept at the same angle to the window from the top to the bottom so that the squeegeeing action is continuous during each vertical stroke.

As shown in Figure 4, the spring 21 is provided with a protective sleeve or cover 25 of rubber or other suitable material to prevent contact with a surface which might be marred by the metal of the spring.

It will be readily seen that in place of the squeegee the head represented thereby could be a brush or some other desired element, and, hence, the description as applied specifically to a squeegee is more broadly applicable.

Having thus described the preferred embodiments of the invention, it should be understood that numerous structural modifications and adaptations may be resorted to without departing from the scope of the appended claim.

What is claimed is:

A flexible implement handle for implements of the type including an elongated flat resilient squeegee blade, head clamped to said squeegee blade and a hollow shank integrally formed with said head intermediate the opposite ends thereof and extending perpendicularly to said head, comprising; a stub handle adapted to be secured in said shank, an elongated handle arranged in axial alignment with said stub handle, said stub handle and said elongated handle having the adjacent ends thereof inwardly tapered terminating in contacting dome shaped ends, a coil spring of a normal diameter greater than said tapered ends, connecting said stub handle to said elongated handle with said coil spring encompassing said tapered ends and closely gripping said stub handle and said elongated handle at only the respective end portions of said spring whereby said stub handle may be readily angularly deflected with respect to said elongated handle upon operation of said squeegee blade, and a rubber sleeve surrounding said coil spring.

References Cited in the file of this patent

UNITED STATES PATENTS

| | | |
|---|---|---|
| 634,637 | Allen | Oct. 10, 1889 |
| 637,668 | Rison | Nov. 21, 1899 |
| 642,873 | Palmer | Feb. 6, 1900 |
| 655,369 | Price | Aug. 7, 1900 |
| 750,357 | Gibbons | Jan. 26, 1904 |
| 1,054,243 | Rogers | Feb. 25, 1913 |
| 1,150,483 | Barber | Aug. 17, 1915 |
| 1,485,036 | Kingsley | Feb. 26, 1924 |
| 2,830,217 | Hodge | Apr. 8, 1958 |